P. BUSTARD.
CARBURETER.
APPLICATION FILED OCT. 29, 1910.
Reissued Dec. 17, 1912. 13,498.
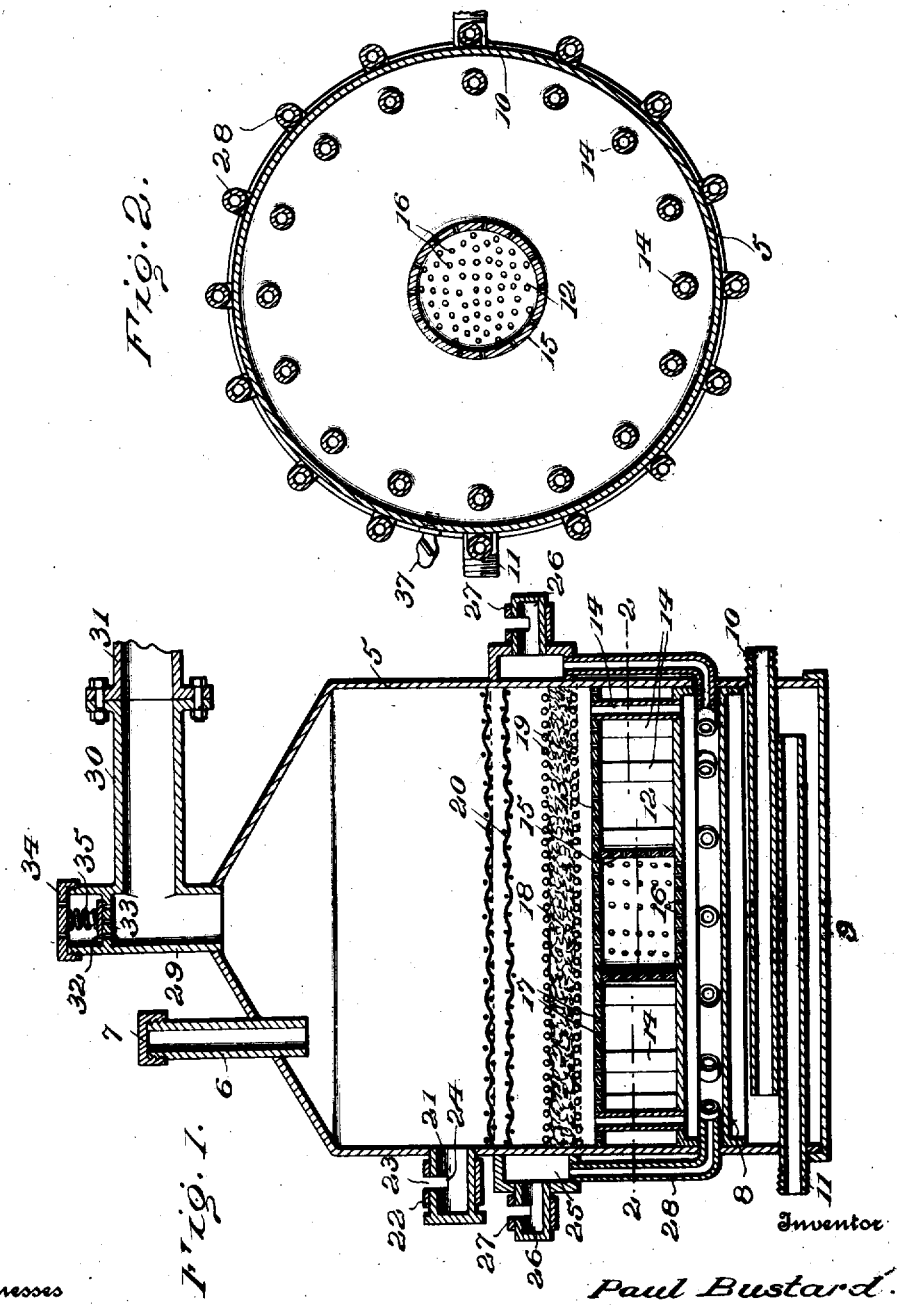
Witnesses
W. A. Woodson
Joana M. Fallin
Inventor
Paul Bustard.
By H. A. Lacey, Attorney.

UNITED STATES PATENT OFFICE.

PAUL BUSTARD, OF FREDERICK, OKLAHOMA.

CARBURETER.

13,498. Specification of Reissued Letters Patent. Reissued Dec. 17, 1912.

Original No. 965,867, dated August 2, 1910, Serial No. 537,550. Application for reissue filed October 29, 1910. Serial No. 589,820.

*To all whom it may concern:*

Be it known that I, PAUL BUSTARD, a citizen of the United States, residing at Frederick, in the county of Tillman and State of Oklahoma, have invented certain new and useful Improvements in Carbureters, of which the following is a specification.

This invention relates to carbureters of that type in which air is forced through a body of hydro-carbon contained in a vessel which is connected to the engine, the apparatus being designed more particularly for use in connection with internal combustion engines, although not limited to such use.

The primary object of the invention is to provide a carbureter which is so constructed that it will be impossible to flood the engine with gasolene in a liquid state, and also to provide a carbureter in which a perfect mixture of air and hydro-carbon vapor is effected, thereby enabling the engine to start on the first complete cycle.

Another object of the invention is to provide a carbureter which shall include the principles of a surface carbureter, a filtration carbureter and a spray carbureter.

A still futher object of the invention is to provide a carbureter in which the inrushing air caused by the suction stroke of the engine, shall cause a plurality of sprays of mixed liquid hydro-carbon and air to be delivered against a screen of absorbent fibrous material, thus charging the screen with liquid hydro-carbon whereby the air passing up through the screen shall become thoroughly impregnated with the hydro-carbon, the screen further acting both to break up the particles of air and intimately mix the particles of gasolene therewith and to catch the surplus liquid hydro-carbon which is not combined with the air, thus causing the gas to be thoroughly dried before passing to the engine.

A further object of the invention is to provide means whereby the liquid hydro-carbon thus caught by the screen shall be returned to the tank or reservoir from which it was ejected.

The invention also has for its object to provide a carbureter embodying certain novel structural details, resulting in greater efficiency, as will be hereinafter described and claimed.

In the accompanying drawings forming a part of the specification, Figure 1 is a vertical section of a carbureter constructed in accordance with my invention. Fig. 2 is a horizontal section on the line 2—2 of Fig. 1.

In the drawings, 5 denotes the casing of the carbureter which forms a tank for containing the supply of gasolene or other hydro-carbon, the tank being provided with a filling tube 6 entering through the top thereof, and provided with a suitable closure 7. In the tank is a false bottom 8 to form a water chamber 9, this chamber being located below the false bottom and the supply of gasolene being carried in the tank above the false bottom. The water chamber is provided for the purpose of heating the gasolene to promote vaporization. Warm water is introduced into the chamber through a pipe 10, and leaves the chamber through a pipe 11, the outlet and inlet ends of said pipe being located respectively adjacent to opposite ends of the chamber, whereby circulation is maintained therein.

Above the false bottom 8, the tank 5 contains horizontal partitions 12 and 13 respectively which are spaced from each other and connected by a series of spray tubes 14 opening therethrough. These spray tubes are preferably arranged in a circular series though this arrangement is not absolutely necessary. One end of each tube 14 opens into the space between the partition 12 and the false bottom 8, and the other end of the tube opens into the space above the partition 13.

Located centrally within the tank and disposed between the partitions 12 and 13, is a perforated annular wall or tube 15. The diameter of this tube is considerably greater than the diameter of the tubes 14, and the latter extend in a circle around the same adjacent to the tank wall. The partition 12 is formed with perforations 16 which are located in the central part of the partition covered by the tube 15. The partition 13 has perforations 17 which extend throughout the entire area thereof, including that portion of the partition which is over the tube 15.

Above the partition 13, there is disposed a screen 18 formed of absorbent fibrous material which is held between gratings of wire gauze. This screen 18 of absorbent material extends entirely across the interior of the tank and above the same is located a plurality of wire gauze screens 20 also extending entirely across the interior of the tank. The screen 18 is relatively thick and as it is made of fibrous material it will absorb gasolene.

Above the screens 20 an air supply tube 21 enters the tank 5. This tube is provided with a valve for controlling the amount of air entering the tank, said valve comprising a sleeve 22 mounted for rotation on the tube 21 and having an opening 23 adapted to more or less register with an opening 24 in the tube.

Below the air tube 21, the tank 5 is encircled on the outside by an air chamber 25, said air chamber being mounted on the tank in any suitable manner and being annular in form. Entering this chamber are the air supply tubes 26, each provided with a valve 27 similar to the valve 22 already described. From the air chamber 25, ducts 28 lead into the tank 5 below the partition 12. A plurality of ducts 28 are provided preferably extending in a circular series around the tank on the outside thereof. At the upper end of the tank is an outlet pipe 29 having a laterally directed branch 30 which is connected to the suction pipe 31 of the engine, (not shown). The pipe 29 is provided with a relief valve 32 seating on a perforated diaphragm 33 located in the pipe 29 above the pipe 30. The upper end of the pipe 29 is closed by a perforated screw cap 34, and between this cap and the valve 32 is interposed a coil spring 35 for holding the valve seated.

In operation the tank 5 is filled with gasolene up to within a short distance from the partition 13. On the suction stroke of the engine, air is drawn down the ducts 28 from the air chamber 25 into the gasolene, and then passes upwardly through the tubes 14 which are partly immersed in the gasolene, these tubes constituting inspirator tubes whereby sprays of mixed air and gasolene are ejected against the screen 18. Particles of gasolene are carried upwardly with the air against the screen 18 which thus becomes saturated with gasolene, so that the air passing therethrough is carbureted. Inasmuch as the screen 18 is relatively thick the entire material of the screen will not be equally saturated with gasolene. The lower portion of the screen, that portion of the screen immediately adjacent to the inspirator tubes 14, will receive the impact of the mixed air and gasolene and will be most fully saturated with gasolene, while succeeding layers of material will be less and less saturated. As the charge passes up through the screen the surplus gasolene will be entirely absorbed or taken up therefrom and the charge left in a dry state. If the air has not taken up sufficient gasolene in its progress from the air inlet opening in the reservoir through the inspirator tubes, then it will absorb gasolene from the lower portion of the fibrous screen 18. The screen thus acts to render uniform the amount of gasolene taken up by the air. The carbureted air passes through the screens 20 and is thoroughly mixed thereby, and upon meeting the incoming current of air entering the tank through the tube 21, commingles therewith and passes in a relatively dry state to the engine. The screen 18 takes up any surplus liquid gasoline so that the gas created by the passage of air and gasolene through the screen 18 will be entirely dried. The valves 22 and 27 will be set to admit a proper volume of air, and after they are set, the engine may be started any number of times without further adjustment.

The surplus gasolene which is detained by the screen 18 eventually drips down onto the partition 13 which forms a drainage plate. The liquid gasolene gathered on this plate passes through the perforations 17 and back into the supply. It will be seen that the gasolene is mixed and broken up initially by being thrown up against the absorbent screen and the wire gauze and that it is also mixed and broken up when dropping back upon the drainage plate and in passing through the perforations 17. The perforations 17 are flared in the direction of the screen 18 and thus their diameter is relatively small at their lower ends, so that while the unused gasolene can drip down through the tank bottom it is prevented from being thrown up against the screen 18 through the perforations 17.

The perforations in the tube 15 permit the gasolene to be maintained at the same level within the tank and permit the gasolene to pass into the lower portion of the tank below the partition 12. At the same time the perforations in the bottom of the partition 12 and in the wall of the pipe 15, being small prevent the gasolene from being thrown upward and against the screen 18 by oscillations of the carbureter due to the movement of the mechanism to which it is attached. The wall 15 also performs another function, in that by dividing the interior of the tank below the partition 13, violent agitation or oscillation of the liquid gasolene in the bottom of the tank is prevented or minimized.

It will be seen that I have provided a carbureter in which a reservoir is provided and a carbureting chamber superposed upon the reservoir, the carbureting chamber and reservoir being separated from each other by a perforated partition, which by permitting the drainage of surplus gasolene back into the reservoir, prevents waste. This perforated partition also prevents gasolene from being splashed upon the screen 18. It will also be seen that in my carbureter the air entering through the ducts 28 passes through a body of gasolene and is forced up through the inspirating tubes 14 and carries with it sufficient hydro-carbon to properly moisten the fibrous screen 18. This fibrous screen acts not only to break up and intermingle the particles of air and gasolene, but also to detain any surplus gasolene and hence the charge which passes into the upper portion of the tank 5 and is mixed with air therein has been perfectly carbureted, uniformly mixed and thoroughly dried.

A carbureter constructed as herein described makes it impossible to flood the engine with gas having globules of liquid gasolene therein, and the engine consequently runs cool and develops a maximum amount of gas with a minimum of liquid hydro-carbon. The resultant pure, dry gas prevents carbon deposits on the cylinder and cylinder head and reduces friction to a minimum. The apparatus is very simple in construction, all gasolene pumps, float feeds and needle valves being dispensed with, and there being no movable parts to get loose or out of order. The efficiency of the apparatus is not affected by water or other impurities in the gasolene as the screen 18 and screen 20 separate the same.

To the bottom of the tank 5 is connected a pet cock 37 for drawing off the gasolene when it is desired to empty the tank and to clean it of impurities.

While my apparatus has been designed for use on internal combustion engines, it is of course to be understood that it may be used for any other apparatus wherein a carbureter is needed.

What I claim is:

1. In a carbureter, a reservoir, a superposed carbureting chamber, a screen of fibrous material extending across the carbureting chamber, a perforated partition extending across the reservoir and below the level of the liquid therein, inspirator tubes extending through said partition with their upper ends above the liquid level in position to discharge a spray of mixed hydro-carbon oil and air against the lower face of the screen, and means for directing air into the reservoir below the partition.

2. A carbureter comprising a tank, spaced partitions in the tank, a perforated tube mounted between the partitions, one of said partitions being perforated throughout its entire area, and the other partition having perforations in its part which is covered by the aforesaid tube, imperforate tubes extending between the partitions and opening therethrough, air supply pipes entering the tank below the partitions, and a screen of absorbent material located above the aforesaid partitions.

3. A carbureter comprising a tank, spaced partitions in the tank, tubes extending between the partitions and opening therethrough, an annular air chamber encircling the tank on the outside thereof, valve-controlled inlets to the chamber, pipes leading from the chamber into the tank below the partitions, and a screen of absorbent material above the aforesaid partitions.

4. A carbureter comprising a tank, spaced partitions in the tank, one of said partitions being perforated, a perforated tube mounted between the partitions, and opening therethrough, and imperforate tubes extending between the partitions and opening therethrough, air supply pipes entering the tank below the partitions, and a screen of absorbent material located above the uppermost partition.

5. A carbureter comprising a tank, spaced partitions in the tank, a perforated tube mounted centrally between the partitions, one of said partitions being perforated throughout its entire area, and the other partition having perforations in its part which is covered by the aforesaid tube, a circular series of imperforate tubes extending between the partitions around the perforated tube, and opening through said partitions, air supply pipes entering the tank below the partitions, and a screen of absorbent material located above the partitions.

PAUL BUSTARD.

Witnesses:
E. E. Howell,
H. G. Bentley.